United States Patent
Eich et al.

(10) Patent No.: US 9,195,225 B1
(45) Date of Patent: Nov. 24, 2015

(54) GRAPHICAL USER INTERFACE VIRTUAL HANDWHEEL FOR A CONTROLLER OF A MOTOR

(71) Applicant: HANDI QUILTER, INC., North Salt Lake, UT (US)

(72) Inventors: Richard Kimball Eich, Layton, UT (US); Shaun Milton Johnson, West Jordan, UT (US)

(73) Assignee: HANDI QUILTER, INC., North Salt Lake, UT (US)

( * ) Notice: Subject to any disclaimer, the term of this patent is extended or adjusted under 35 U.S.C. 154(b) by 0 days.

(21) Appl. No.: 14/516,274

(22) Filed: Oct. 16, 2014

(51) Int. Cl.
| | |
|---|---|
| *G06F 7/66* | (2006.01) |
| *G05B 15/02* | (2006.01) |
| *G05B 19/18* | (2006.01) |
| *D05B 19/00* | (2006.01) |

(52) U.S. Cl.
CPC ............... *G05B 15/02* (2013.01); *D05B 19/00* (2013.01); *G05B 19/182* (2013.01); *G05B 2219/45195* (2013.01)

(58) Field of Classification Search
CPC .... D05B 19/003; D05B 19/006; D05B 19/02; D05B 19/04; D05B 19/105; D05B 19/12; D05B 19/14; D05B 19/00; D05C 5/02; G05B 19/182; G05B 15/02
USPC ................ 700/136–138; 112/470.01, 470.04, 112/475.18
See application file for complete search history.

(56) References Cited

U.S. PATENT DOCUMENTS

| | | | |
|---|---|---|---|
| 7,720,552 B1 * | 5/2010 | Lloyd ............................ 700/10 |
| 7,878,133 B2 * | 2/2011 | Tokura et al. ............ 112/470.04 |
| 7,971,543 B2 * | 7/2011 | Nagai et al. ................ 112/102.5 |
| 8,933,876 B2 * | 1/2015 | Galor et al. .................... 345/156 |
| 9,076,194 B2 * | 7/2015 | Gylling et al. | |
| 2003/0117380 A1 * | 6/2003 | Kanzaki ........................ 345/173 |
| 2003/0183146 A1 * | 10/2003 | Usa ................................ 112/285 |
| 2008/0211779 A1 * | 9/2008 | Pryor ............................. 345/173 |
| 2008/0216725 A1 * | 9/2008 | Tokura et al. ............ 112/470.04 |
| 2008/0281442 A1 * | 11/2008 | Huckemann et al. ........... 700/85 |
| 2010/0186646 A1 * | 7/2010 | Stokes et al. ............ 112/470.05 |
| 2010/0199228 A1 * | 8/2010 | Latta et al. ..................... 715/863 |
| 2011/0029865 A1 * | 2/2011 | Gilland et al. ................. 715/702 |
| 2012/0226977 A1 * | 9/2012 | Lengeling et al. ............. 715/702 |
| 2013/0190916 A1 * | 7/2013 | Schnaufer et al. ............ 700/137 |
| 2013/0249814 A1 * | 9/2013 | Zeng ............................. 345/173 |
| 2014/0266569 A1 * | 9/2014 | Yoshikawa et al. ............ 340/4.4 |
| 2014/0270256 A1 * | 9/2014 | Yoshikawa et al. ........... 381/109 |

* cited by examiner

*Primary Examiner* — Nathan Durham
(74) *Attorney, Agent, or Firm* — Maschoff Brennan (57) ABSTRACT

Graphical user interface virtual control for a controller of a motor. In one example embodiment, one or more programs that are configured, when executed, to cause one or more processors to generate and visually present a graphical user interface (GUI) virtual handwheel for a controller of a motor. In this example embodiment, the GUI virtual handwheel includes a depiction of a physical handwheel that is oriented with a perspective orientation. The depiction of the physical handwheel is configured, upon receipt of a first input from a user along the length of the depiction in a first direction, to send a first electronic signal to the controller of the motor to cause the motor to cause a first effect that corresponds to physically rotating the physical handwheel in a first rotational direction that corresponds to the first direction.

21 Claims, 8 Drawing Sheets

GRAPHICAL USER INTERFACE VIRTUAL HANDWHEEL FOR A CONTROLLER OF A MOTOR

FIELD

The embodiments disclosed herein relate to a graphical user interface (GUI) virtual handwheel for a controller of a motor.

BACKGROUND

Many machines include a motor for moving one or more components of the machine in one of two directions. In addition, many motorized machines also include a physical handwheel that is mechanically coupled to one or more of the same components of the machine. Manually rotating the physical handwheel clockwise causes the coupled components to move in one direction, and manually rotating the physical handwheel counterclockwise causes the coupled components to move in the opposite direction.

One common problem with a physical handwheel is the difficulty associated with gaining physical access to the physical handwheel. For example, in a long-arm sewing machine, a physical handwheel may be positioned on the rear end of the machine, which may be several feet from the position of the user while operating the machine. The relatively distant location of the physical handwheel on the rear end of a long-arm sewing machine may make it difficult for the user to reach all the way to the rear end of the machine in order to manually rotate the physical handwheel during the course of operating the machine.

Another common problem with a physical handwheel is the difficulty associated with manually rotating the physical handwheel. For example, in a long-arm sewing machine, a physical handwheel may be configured to at least partially manually move otherwise motorized components of the machine. This manual movement of otherwise motorized components may be designed to allow these components to move in a slower and more controlled fashion than is possible when using the motor to move the same components. However, some users, especially older users, may have difficulty in manually rotating the handwheel on a long-arm sewing machine due to the natural resistance of the otherwise motorized components that are mechanically linked to the physical handwheel.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to a graphical user interface (GUI) virtual handwheel for a controller of a motor. The example GUI virtual handwheel disclosed herein may include a depiction of a physical handwheel that is visually presented on an electronic display device and that is configured to send an electronic signal to a controller of a motor to cause the motor to cause an effect that corresponds to physically rotating the physical handwheel. The example GUI virtual handwheel disclosed herein may be employed to replace, or function in connection with, a physical handwheel in a variety of different motorized machines including, but not limited to, a sewing machine, a remote control vehicle, a remote access valve, a remote access floodgate, a drill press, a computer numerical control (CNC) machine, a winch, or a crane.

In one example embodiment, one or more non-transitory computer-readable media store one or more programs that are configured, when executed, to cause one or more processors to generate and visually present, on an electronic display device associated with the one or more processors, a graphical user interface (GUI) virtual handwheel for a controller of a motor. In this example embodiment, the GUI virtual handwheel includes a depiction of a physical handwheel that is oriented with a perspective orientation where a length of the depiction is greater than a width of the depiction. The depiction of the physical handwheel is configured, upon receipt of a first input from a user along the length of the depiction in a first direction, to send a first electronic signal to the controller of the motor to cause the motor to cause a first effect that corresponds to physically rotating the physical handwheel in a first rotational direction that corresponds to the first direction.

In another example embodiment, a sewing machine includes a motor, a controller configured to control the motor, a needle bar configured to have a needle attached thereto, a driveshaft mechanically coupled to the needle bar, a physical handwheel, an electronic display device, and one or more processors. The physical handwheel is configured, when physically rotated by a user, to cause the driveshaft to rotate, which causes the needle bar to reciprocate the needle into and out of a fabric. The sewing machine also includes one or more non-transitory computer-readable media storing one or more programs that are configured, when executed, to cause the one or more processors to generate and visually present, on the electronic display device, a graphical user interface (GUI) virtual handwheel. The GUI virtual handwheel includes a depiction of the physical handwheel that is oriented with a perspective orientation where a length of the depiction is greater than a width of the depiction. The depiction of the physical handwheel is configured, upon receipt of an input from the user along the length of the depiction, to send an electronic signal to the controller of the motor to cause the motor to rotate to cause the driveshaft to rotate, which causes the needle bar to reciprocate the needle into and out of the fabric.

It is to be understood that both the foregoing general description and the following detailed description are exemplary and explanatory and are not restrictive of the invention as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
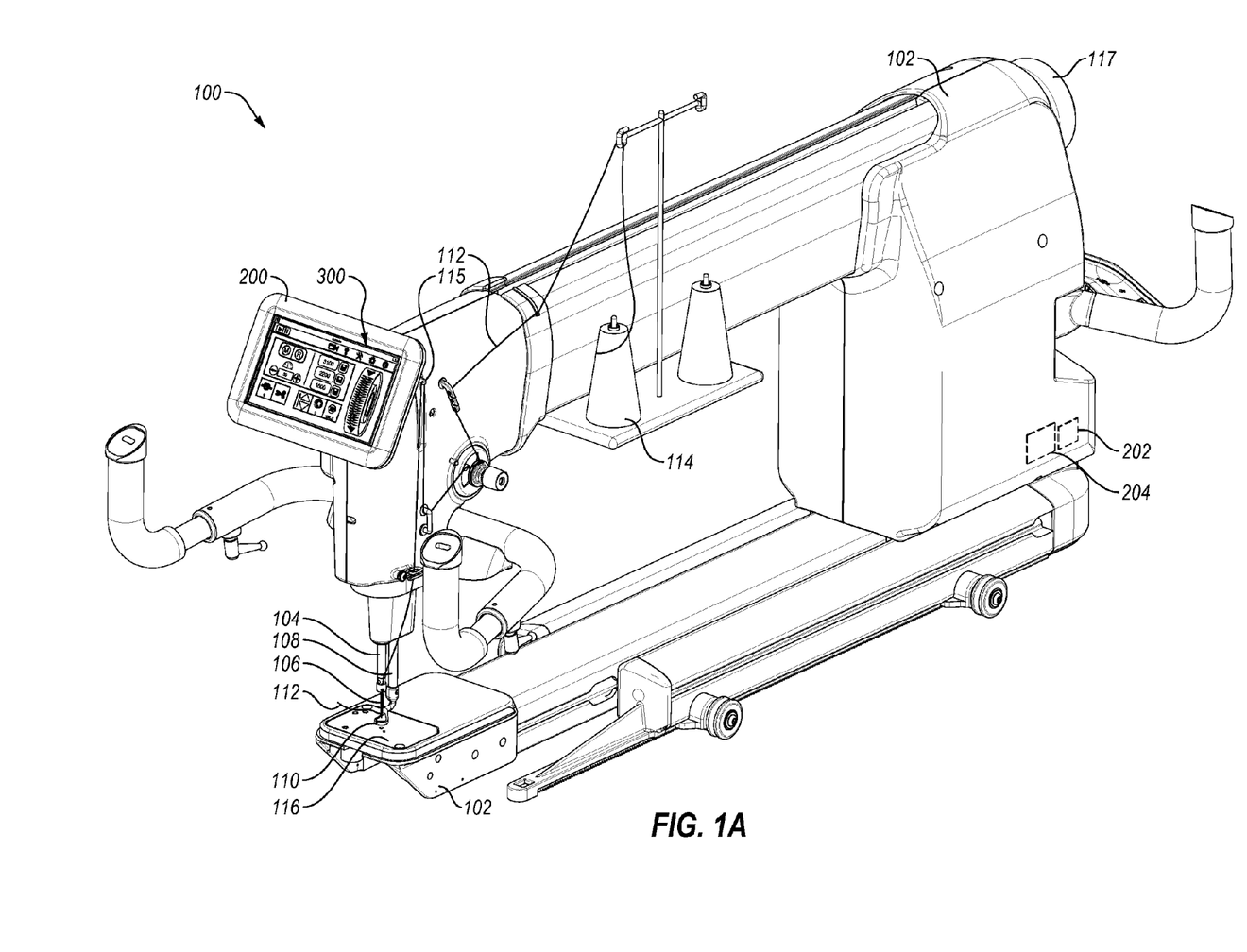
FIG. 1A is a front perspective view of an example sewing machine including an example physical handwheel, an example GUI virtual handwheel, an example needle bar, and an example presser bar.
Figure 1B:
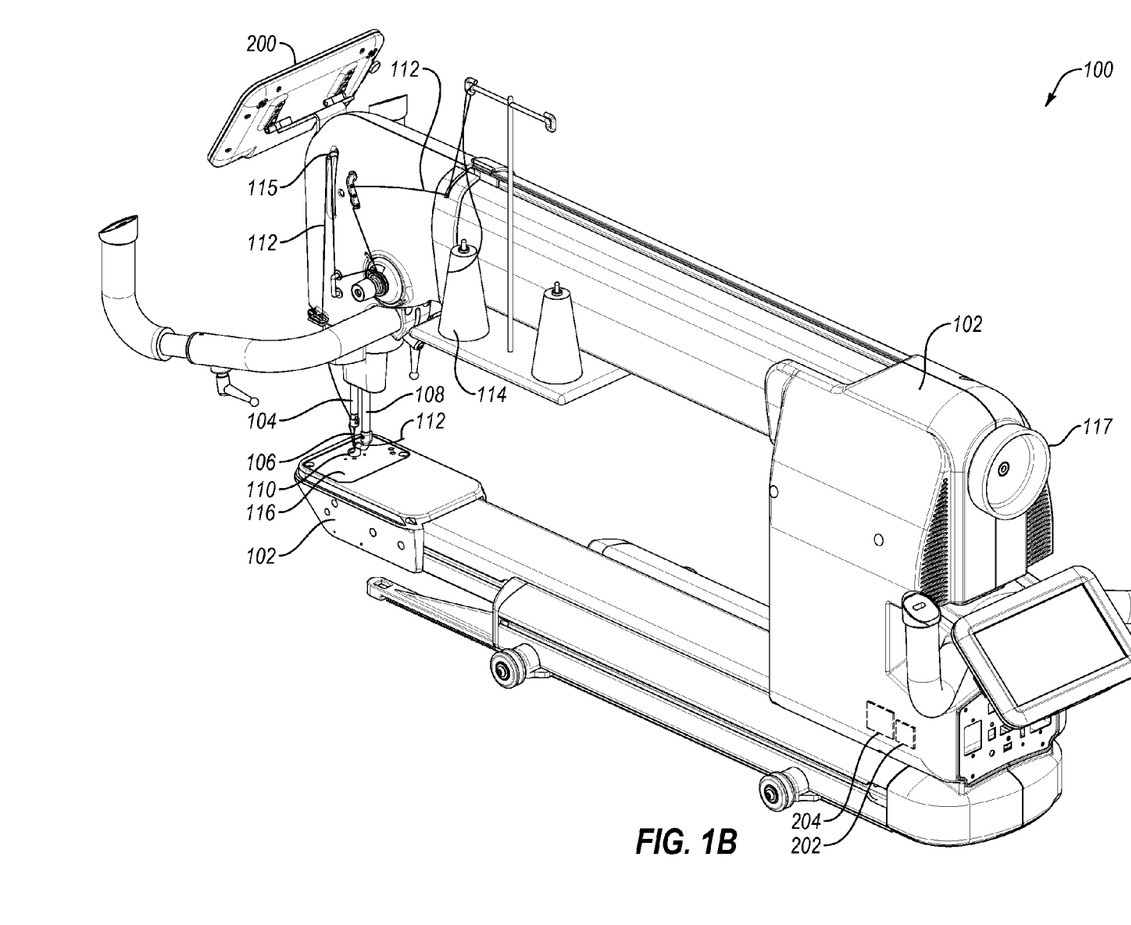
FIG. 1B is a rear perspective view of the example sewing machine of FIG. 1A.

FIG. 1A is a front perspective view of an example sewing machine 100, and FIG. 1B is a rear perspective view of the example sewing machine 100. The example sewing machine 100 of FIGS. 1A and 1B is specialized for quilting and is known as a long-arm quilting machine. Quilting typically involves stitching together multiple layers of fabric to form a quilt. A quilt typically includes a layer of batting sandwiched in between upper and lower layers of fabric.

Figure 2:
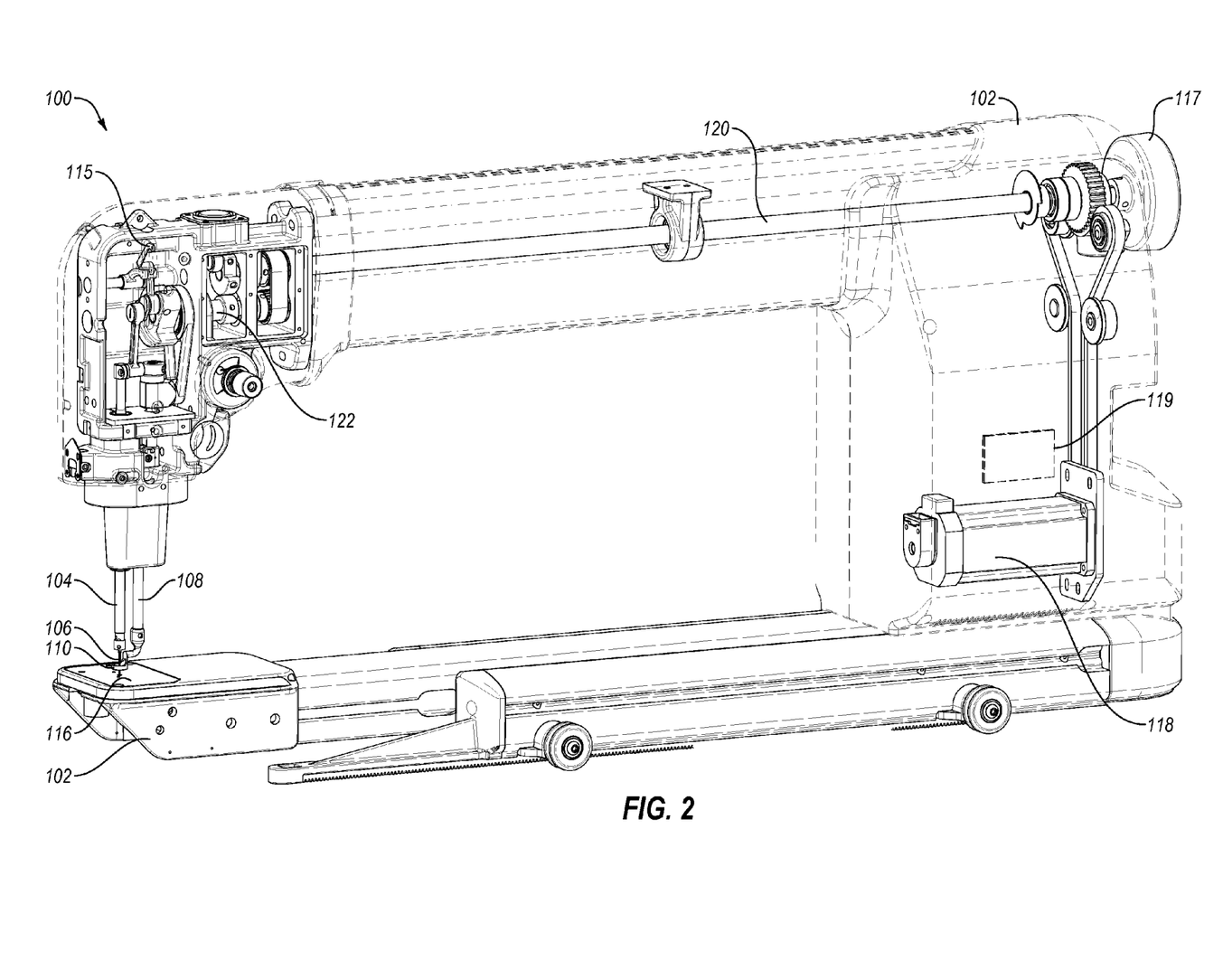
FIG. 2 is a partial perspective view of the example sewing machine of FIG. 1A.

As disclosed in FIGS. 1A and 1B, the sewing machine 100 may include one or more housings 102 which house various internal components of the sewing machine 100, some of which are disclosed in greater detail in FIG. 2. The sewing machine 100 may also include a needle bar 104 that is configured to have a needle 106 attached thereto and a presser bar 108 having a hopping foot 110 attached thereto. A top thread 112 from a spool 114 may be passed through various thread guides, including a take-up lever 115, until finally the top thread 112 is threaded through the eye of the needle 106.

Although not shown in FIGS. 1A and 1B, it is understood that the sewing machine may also include a bobbin holder configured to hold a bobbin that is wound with bottom thread, and a bobbin hook, both generally positioned in the housing 102 underneath a needle plate 116.

During operation of the sewing machine 100, the threaded needle 106 may be repeatedly driven through one or more layers of fabric (not shown). Simultaneously, the bobbin hook may be driven to repeatedly catch the top thread 112 (which has been driven through the one or more layers of fabric) and loop the top thread 112 around the bobbin, and then the take-up lever 115 may be driven to take up the top thread 112, to form a row of stitches of the top thread 112 and the bottom thread in the one or more layers of fabric. Also simultaneously, the hopping foot 110 may be repeatedly driven up and down to alternate between holding the one or more layers of fabric in place during the finalization of each stitch and releasing the one or more layers of fabric to facilitate their movement between each stitch.

The up-and-down motion (as oriented in FIGS. 1A and 1B), also known as reciprocating motion, of the needle bar 104 and the presser bar 108 during operation of the sewing machine 100, as well as the motion of the take-up lever 115 and the motion of other components including mechanical linkages of the sewing machine 100, may be caused by an electric motor 118 (see FIG. 2). Alternatively, these motions in the sewing machine 100 may be caused by a user manually rotating a physical handwheel 117. It is understood that the physical handwheel 117 may enable slower and more controlled motions of the components of the sewing machine 100 than is possible when using electronic controls to control the electric motor 118 (see FIG. 2) to move the same components. For example, using electronic controls, the electric motor 118 may be operated at over 3000 stitches per minutes, but manually rotating the physical handwheel 117 may enable the user to slow down the stitches to as few as one stitch, or only a partial stitch, per minute. Manual rotation of the physical handwheel 117 may also enable a rapid back-and-forth rotation in order to help clear extraneous thread lodged within the bobbin hook, as discussed in greater detail below in connection with FIG. 4. Therefore, the electric motor 118 or manual rotation of the physical handwheel 117 may be configured to cause the needle bar 104 to reciprocate the needle 106 into and out of a fabric to cause the presser bar 108 to reciprocate the hopping foot 110 onto and off of the fabric.

In addition, as disclosed in FIGS. 1A and 1B, the sewing machine 100 may include an electronic display device 200. The electronic display device 200 may be in electronic communication with one or more processors 202 of the sewing machine 100, which may be in electronic communication with one or more non-transitory computer-readable media 204. As disclosed in FIG. 1A, the one or more non-transitory computer-readable media 204 may store one or more programs that are configured, when executed, to cause the one or more processors to generate and visually present, on the electronic display device 200, a graphical user interface (GUI) virtual handwheel 300 for a controller 119 of the electric motor 118 (see FIG. 2). The GUI virtual handwheel 300 may include a depiction of the physical handwheel 117 that is visually presented on the electronic display device 200 and that is configured to send an electronic signal to the controller 119 of the electric motor 118 to cause the electric motor 118 to cause an effect that corresponds to physically rotating the physical handwheel 117. Thus, the GUI virtual handwheel 300 disclosed herein may be employed to replace, or function in connection with, the physical handwheel 117 in the sewing machine 100. The position of the GUI virtual handwheel 300 on the electronic display device 200 on the front end of the sewing machine 100 may overcome the difficulty associated with the relatively distant location of the physical handwheel 117 on the rear end of the sewing machine 100. Further, the motorization of the physical handwheel 117 in the GUI virtual handwheel 300, even in alternative embodiments of the sewing machine 100 where the physical handwheel 117 is positioned near the front end of the sewing machine 100, may overcome the difficulty associated with the natural resistance of the otherwise motorized components that are mechanically linked to the physical handwheel 117.

Although the example sewing machine 100 of FIGS. 1A and 1B is a long-arm quilting machine, it is understood that the sewing machine 100 of FIGS. 1A and 1B is only one of countless sewing machines in which the example GUI virtual handwheel 300 may be employed. In addition, the GUI virtual handwheel 300 disclosed herein may be employed to replace, or function in connection with, a physical handwheel that controls any of a variety of different motorized machines including, but not limited to, a remote control vehicle, a remote access valve, a remote access floodgate, a drill press, a computer numerical control (CNC) machine, a winch, or a crane. The motor in these motorized machines may be electric motors or other types of motors, such as gasoline powered or diesel fuel-powered motors. Therefore, the scope of the example GUI virtual handwheel 300 is not intended to be limited to employment in any particular motorized machine.

FIG. 2 is a partial perspective view of the example sewing machine 100. As disclosed in FIG. 2, the one or more housings 102 of the sewing machine 100 may house various internal components including the electric motor 118, the controller 119 of the electric motor 118, a first driveshaft 120, and a second driveshaft 122. During operation of the sewing machine 100, the electric motor 118 may be configured, among other things, to rotate the first driveshaft 120.

The rotation of the first driveshaft 120 may cause motion in various other components of the sewing machine 100, including motion in the needle bar 104 and the presser bar 108, which motion is discussed in greater detail in connection with FIGS. 3A-3D. In general, however, the rotation of the first driveshaft 120 may indirectly cause, via rotation of the second driveshaft 122 and motion in the take-up lever 115 and various other mechanical linkages, the reciprocating motions of the needle bar 104 and the presser bar 108, which result in the needle 106 reciprocating into and out of a fabric (not shown) and the hopping foot 110 reciprocating onto and off of the fabric.

As disclosed in FIG. 2, manual rotation of the physical handwheel 117 may also be configured to rotate the first driveshaft 120. This manual rotation of the physical handwheel 117 may be somewhat difficult, however, where the user is positioned at the front end of the sewing machine 100, since the physical handwheel 117 is positioned at the rear of the sewing machine 100. In addition, the manual rotation of the first driveshaft 120 via manual rotation of the physical handwheel 117 may be difficult due to the natural resistance of the otherwise motorized components that are mechanically linked to the physical handwheel 117.

To remedy these difficulties with manual rotation of the physical handwheel 117, the sewing machine 100 may include the electronic display device 200 and the GUI virtual handwheel 300, as disclosed in FIGS. 1A and 1B and FIGS. 3A-4, that is configured to send an electronic signal to the controller 119 of the electric motor 118 to cause the electric motor 118 to cause an effect that corresponds to physically rotating the physical handwheel 117. For example, in some example embodiments, a full virtual clockwise rotation of the GUI virtual handwheel 300 may have the same effect as a full physical clockwise rotation of the physical handwheel 117. Similarly, a full virtual counterclockwise rotation of the GUI virtual handwheel 300 may have the same effect as a full physical counterclockwise rotation of the physical handwheel 117. In some example embodiments, the controller 119 may be a servo controller, and the electric motor 118 may be a servo electric motor, which may give greater control over the exact position of the electric motor 118. Thus, the GUI virtual handwheel 300 disclosed herein may be employed to replace, or function in connection with, the physical handwheel 117 in the sewing machine 100. The position of the GUI virtual handwheel 300 on the electronic display device 200 on the front end of the sewing machine 100 may overcome the difficulty associated with reaching all the way back to the relatively distant location of the physical handwheel 117 on the rear end of the sewing machine 100. Further, the motorization of the physical handwheel 117 in the GUI virtual handwheel 300 may overcome the difficulty associated with the natural resistance of the otherwise motorized components that are mechanically linked to the physical handwheel 117.

FIGS. 3A-3D are partial cross-sectional side views of positions of the example needle bar 104 and the example presser bar 108 with corresponding views of the example GUI virtual handwheel 300 being manipulated by a user's hand 400. The coordinated motion of the example needle bar 104 and the example presser bar 108 caused by manipulation of the example GUI virtual handwheel 300 will now be discussed in connection with FIGS. 3A-3D.

As disclosed in FIGS. 3A-3D, the GUI virtual handwheel 300 may include a depiction 301 of the physical handwheel 117 (see FIG. 2). The depiction 301 may be oriented with a perspective orientation where a length L of the depiction 301 is greater than a width W of the depiction 301. In at least some example embodiments, this perspective orientation of the depiction 301 may resemble the perspective orientation of the physical handwheel 317 that is visible to a user when the user is positioned on the side of, and slightly to the rear of, the sewing machine 100, similar to the perspective orientation visible in FIG. 1A.

Figure 3A:
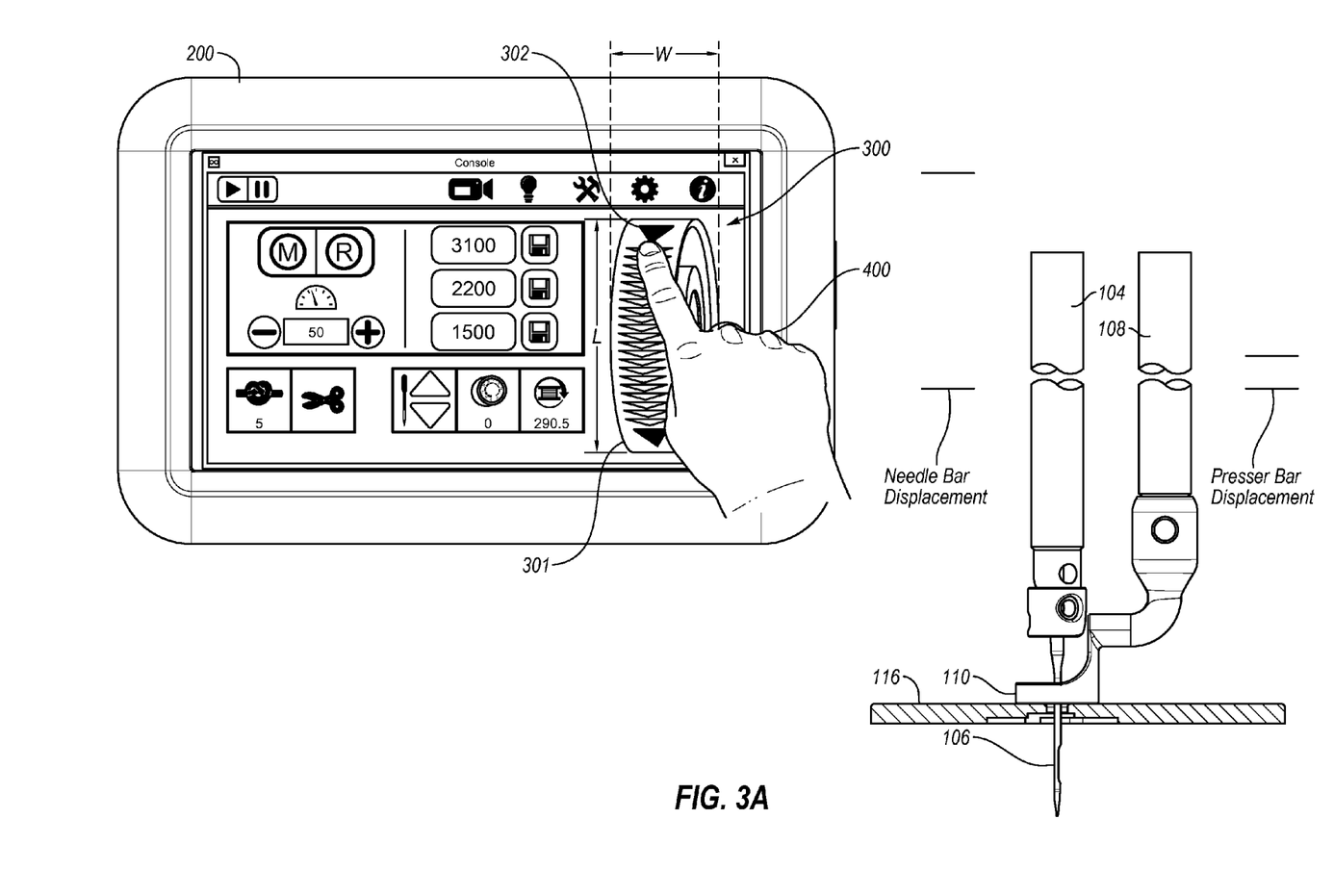
FIGS. 3A-3D are partial cross-sectional side views of positions of the example needle bar and the example presser bar of FIG. 1A with corresponding views of the example GUI virtual handwheel of FIG. 1A being manipulated by a user.
Figure 3B:
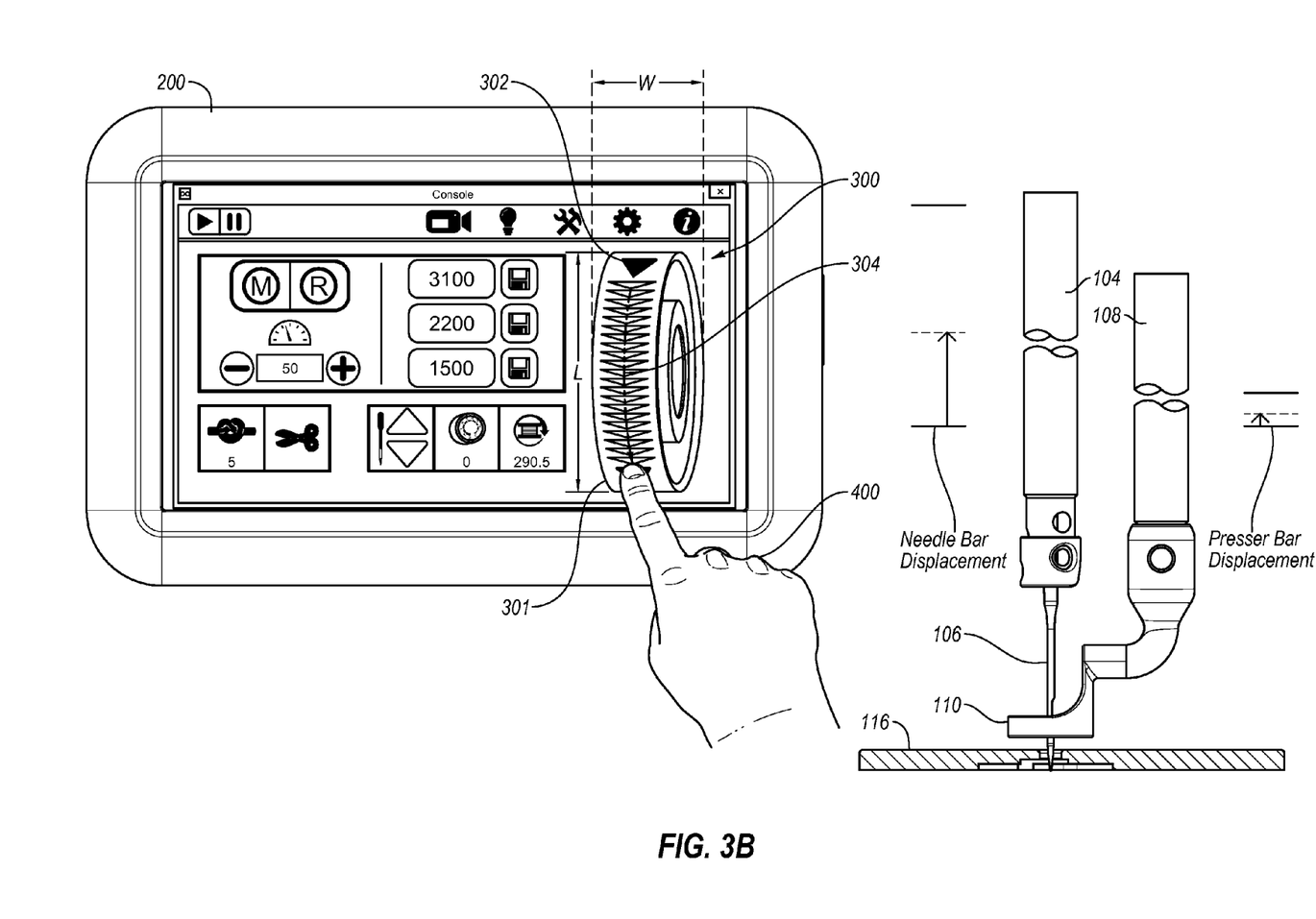
Figure 3C:
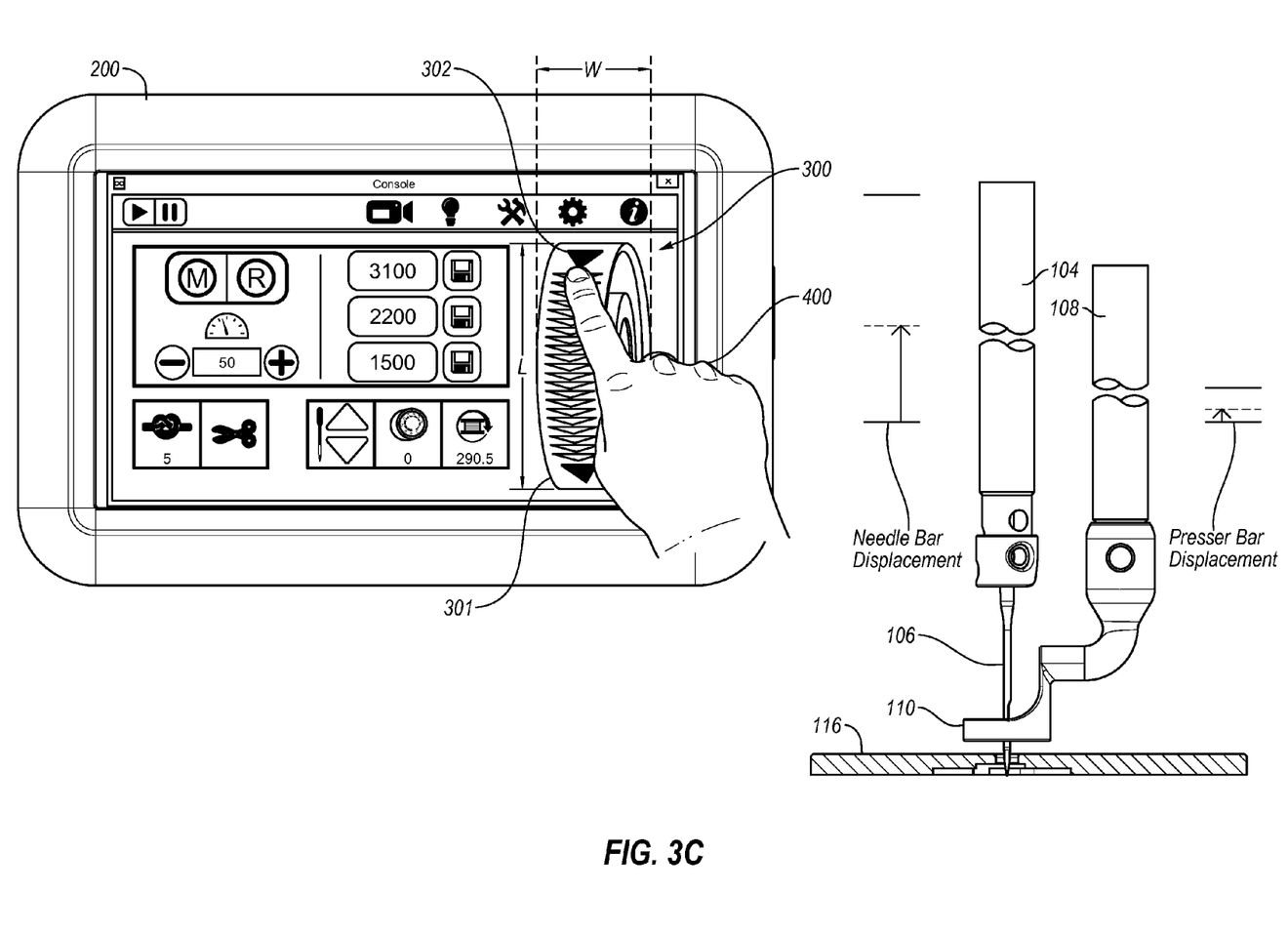
Figure 3D:
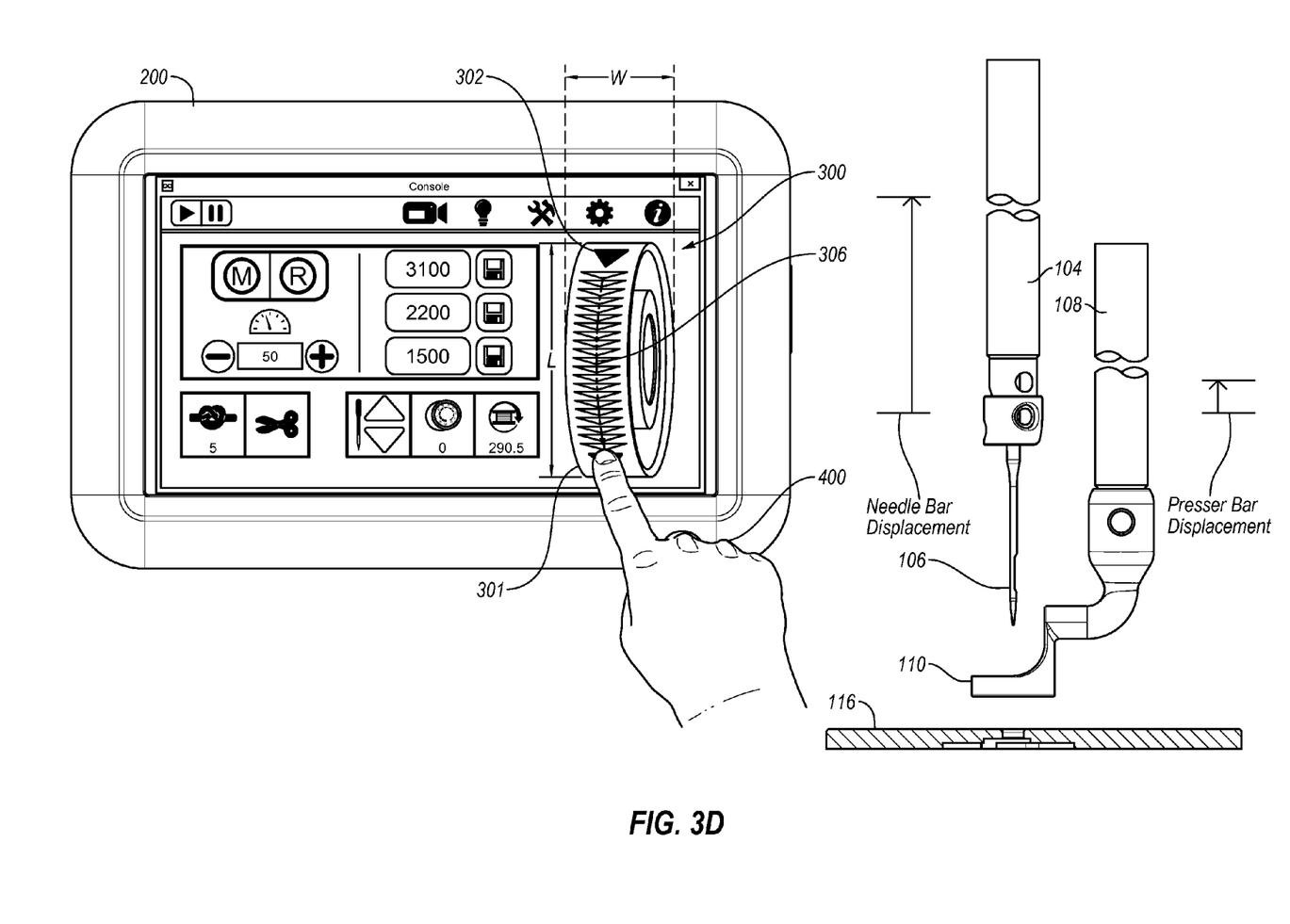

As disclosed in the progression from FIG. 3A to FIG. 3B, and also in FIG. 2, the depiction 301 may be configured, upon receipt of a first input 304 from the user's hand 400 along the length L of the depiction 301 in a downward direction, to send an electronic signal to the controller 119 of the electric motor 118 to cause the electric motor 118 to cause an effect that corresponds to physically rotating the physical handwheel 117 in a counterclockwise rotational direction that corresponds to the downward direction of the input 304. The effect of the input 304 between FIGS. 3A and 3B is that the needle bar 104 and the presser bar 108 are partially raised up. Further, as disclosed in the progression from FIG. 3C to FIG. 3D, and also in FIG. 2, the depiction 301 may be configured, upon receipt of an input 306 from the user's hand 400 along the length L of the depiction 301 in a downward direction, to send an electronic signal to the controller 119 of the electric motor 118 to cause the electric motor 118 to again cause an effect that corresponds to physically rotating the physical handwheel 117 in a counterclockwise rotational direction that corresponds to the downward direction of the input 306. The effect of the input 306 between FIGS. 3C and 3D is that the needle bar 104 and the presser bar 108 are now fully raised up.

It is also understood that the user may continue to enter inputs similar to the inputs 304 and 306 into the GUI virtual handwheel 300 in order to cause the needle bar 104 to reciprocate the needle 106 into and out of a fabric (not shown) and to cause the presser bar 108 to reciprocate the hopping foot 110 onto and off of the fabric. It is further understood, in connection with FIGS. 3A-3D and FIG. 2, that the depiction 301 may be configured, upon receipt of an input from the user's hand 400 along the length L of the depiction 301 in an upward direction, to send an electronic signal to the controller 119 of the electric motor 118 to cause the electric motor 118 to cause an effect that corresponds to physically rotating the physical handwheel 117 in a clockwise rotational direction that corresponds to the upward direction of the input. The effect of this input is that the needle bar 104 and the presser bar 108 are raised up or lowered down, depending on where the needle bar 104 and the presser bar 108 are in their respective reciprocating cycles. The inputs into the depiction 301 of the GUI virtual handwheel 300 may therefore cause the needle 106 attached to the needle bar 104 to transition from a position above the fabric to a position in the fabric or transition from the position in the fabric to the position above the fabric, for example.

As disclosed in FIGS. 3A-3D, the GUI virtual handwheel 300 may also include a direction indicator 302 in the downward direction that indicates an input direction that corresponds to a forward sewing direction. It is understood that the GUI virtual handwheel 300 may additionally or alternatively include a direction indicator in the upward direction that indicates an input direction that corresponds to a reverse sewing direction. In either case, the direction indicator may assist the user in determining which direction to manipulate the GUI virtual handwheel 300.

The electronic display device 200 may be any type of electronic display device, such as a liquid crystal display (LCD). Further, the electronic display device 200 may additionally or alternatively be a resistive touchscreen display device or a capacitive touchscreen display device, and may be integral to or separable from the sewing machine 100. In either touchscreen example, the inputs 304 and 306 may be a touch swipe by the user's hand 400 on a surface of the touchscreen display device. Further, where the electronic display device 200 is a capacitive touchscreen display device, the inputs 304 and 306 may be a gesture by the user's hand 400 near the capacitive touchscreen display device that does not involve touching the capacitive touchscreen display device. This gesture may be a substantially linear wave of at least a portion of the user's hand 400 near the capacitive touchscreen display device. A touch swipe and a substantially linear wave are but two examples of inputs that may be employed to manipulate the GUI virtual handwheel 300, and any other input may instead be employed including, but not limited to, such as a tap, a double tap, a press and hold, a flick, a two-finger pinch, a two finger zoom, a two-finger rotate, a two-finger tap, a two-finger double tap, or some combination thereof. Also, the input may be a gesture that is sensed by a motion sensor that is integrated into the electronic display device 200 or that is separate from, and in electrical communication with, the electronic display device 200.

It is understood that while the inputs 304 and 306 along the length L of the depiction 301 are in curved directions to track a curvature of the depiction 301, the inputs 304 and 306 may instead be in a substantially linear direction. It is further understood that the inputs 304 and 306 may be made on a non-touchscreen electronic display using any type of input device such as a mouse. It is also understood that the inputs 304 and 306 may be configured to be speed sensitive, such that an input at a faster speed moves the depiction 301, and the needle bar 104 and the presser bar 108, farther than the same input at a slower speed. It is further understood that the input 304 or 306 may cause the depiction 301 to coast to a stop after some predetermined period of time after the input 304 or 306 has been received. This coasting of the depiction 301 may be shorter where the input 304 or 306 is slower, and may last longer where the input 304 or 306 is faster. It is also understood that the inputs 304 and 306 may be configured to move the needle bar 104 and the presser bar 108 more or less than depicted in FIGS. 3A-3D. For example, each of the input 304 or 306 may be configured to represent a full rotation, a half rotation, a quarter rotation, or any other partial rotation, or any other number of full rotations, of the depiction 301 of the GUI virtual handwheel 300. It is further understood that the depiction 301 of the GUI virtual handwheel 300 may be configured to be visually rotated on the electronic display device 200, such that a user may view, in real time, a substantially linear input 304 or 306 be translated into a rotational movement of the GUI virtual handwheel 300 on the electronic display device 200.

Figure 4:
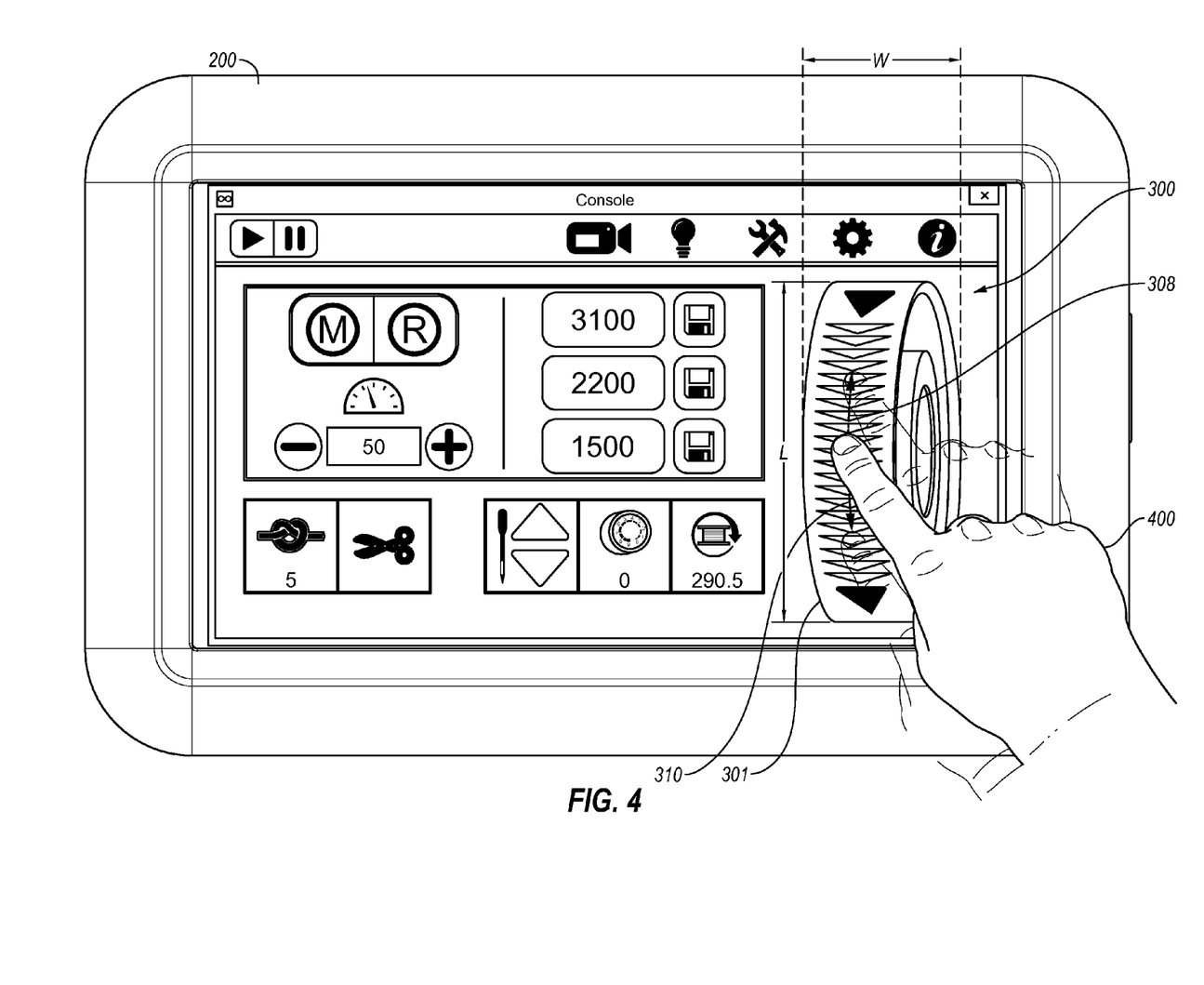
FIG. 4 is a view of the example GUI virtual handwheel of FIG. 1A being manipulated by a user to help clear extraneous thread in the sewing machine of FIG. 1A.

FIG. 4 is a view of the example GUI virtual handwheel 300 being manipulated by a user's hand 400 to help clear extraneous thread. With reference also to FIG. 2, the bobbin hook of the sewing machine 100, discussed above, may include a cutter that may be employed to help clear extraneous thread that has lodged within the bobbin hook that prevents the sewing machine 100 from operating properly. This cutter of the bobbin hook may be configured to cut through the extraneous thread. This cutter may be activated against the extraneous thread using the GUI virtual handwheel 300. In particular, as disclosed in FIG. 2 and FIG. 4, the depiction 301 of the physical handwheel 117 (see FIG. 2) may be further configured, upon receipt of alternating inputs 308 and 310 from the user's hand 400 along the length L of the depiction 301, to send alternating electronic signals to the controller 119 of the electric motor 118 to cause the electric motor 118 to cause the first driveshaft 120 (see FIG. 2) to alternatingly rotate, which causes the cutter of the bobbin hook to cut through the extraneous thread lodged within the bobbin hook.

The embodiments described herein may include the use of a special-purpose or general-purpose computer, including various computer hardware or software modules, as discussed in greater detail below.

Embodiments described herein may be implemented using non-transitory computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store one or more desired programs having program code in the form of computer-executable instructions or data structures and which may be accessed and executed by a general-purpose computer, special-purpose computer, or virtual computer such as a virtual machine. Combinations of the above may also be included within the scope of computer-readable media.

Computer-executable instructions comprise, for example, instructions and data which, when executed by one or more processors, cause a general-purpose computer, special-purpose computer, or virtual computer such as a virtual machine to perform a certain method, function, or group of methods or functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "program" may refer to software objects or routines that execute on a computing system. The different programs described herein may be implemented as objects or processes that execute on a computing system (e.g., as separate threads). While the GUIs described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. One or more non-transitory computer-readable media storing one or more programs that are configured, when executed, to cause one or more processors to generate and visually present, on an electronic display device associated with the one or more processors, a graphical user interface (GUI) virtual handwheel for a controller of a motor, the GUI virtual handwheel comprising:
    a depiction of a circular physical handwheel that includes a side and a fully-depicted front face and that is:
        oriented with a sideways perspective orientation where a vertical dimension of the depiction is greater than a horizontal dimension of the depiction; and
        configured, upon receipt of a first input from a user on the side of the virtual handwheel along the vertical dimension of the depiction in a first direction, to send a first electronic signal to the controller of the motor to cause the motor to cause a first effect that corresponds to physically rotating the circular physical handwheel in a first rotational direction that corresponds to the first direction.

2. The one or more non-transitory computer-readable media as recited in claim 1, wherein the depiction is further configured, upon receipt of a second input from the user on the side of the virtual handwheel along the vertical dimension of the depiction in a second direction, to send a second electronic signal to the controller of the motor to cause the motor to cause a second effect that corresponds to physically rotating the circular physical handwheel in a second rotational direction that corresponds to the second direction.

3. The one or more non-transitory computer-readable media as recited in claim 2, wherein:
the first direction is a first substantially linear direction; and
the second direction is a second substantially linear direction that is opposite to the first substantially linear direction.

4. The one or more non-transitory computer-readable media as recited in claim 2, wherein the electronic display device is a touchscreen display device.

5. The one or more non-transitory computer-readable media as recited in claim 2, wherein the electronic display device is a resistive touchscreen display device.

6. The one or more non-transitory computer-readable media as recited in claim 5, wherein the input from the user is a touch swipe by the user on a surface of the resistive touchscreen display device.

7. The one or more non-transitory computer-readable media as recited in claim 2, wherein the electronic display device is a capacitive touchscreen display device.

8. The one or more non-transitory computer-readable media as recited in claim 7, wherein the input from the user is a substantially linear wave of at least a portion of the user's hand near the capacitive touchscreen display device that does not involve touching the capacitive touchscreen display device.

9. The one or more non-transitory computer-readable media as recited in claim 1, wherein the input from the user is a gesture that is sensed by a motion sensor that is integrated into the electronic display device or that is separate from, and in electrical communication with, the electronic display device.

10. The one or more non-transitory computer-readable media as recited in claim 1, wherein the motor is integrated into a sewing machine, a remote control vehicle, a remote access valve, a remote access floodgate, a drill press, a computer numerical control (CNC) machine, a winch, or a crane.

11. A sewing machine comprising:
a motor;
a controller configured to control the motor;
a needle bar configured to have a needle attached thereto;
a driveshaft mechanically coupled to the needle bar;
a circular physical handwheel configured, when physically rotated by a user, to cause the driveshaft to rotate, which causes the needle bar to reciprocate the needle into and out of a fabric;
an electronic display device;
one or more processors; and
one or more non-transitory computer-readable media storing one or more programs that are configured, when executed, to cause the one or more processors to generate and visually present, on the electronic display device, a graphical user interface (GUI) virtual handwheel, the GUI virtual handwheel including:
a depiction of the circular physical handwheel that includes a side and a fully-depicted front face and that is:
oriented with a sideways perspective orientation where a vertical dimension of the depiction is greater than a horizontal dimension of the depiction; and
configured, upon receipt of an input from the user along the vertical dimension of the depiction, to send an electronic signal to the controller of the motor to cause the motor to rotate to cause the driveshaft to rotate, which causes the needle bar to reciprocate the needle into and out of the fabric.

12. The sewing machine as recited in claim 11, wherein the GUI virtual handwheel further includes a direction indicator that indicates an input direction that corresponds to a forward sewing direction.

13. The sewing machine as recited in claim 11, wherein the GUI virtual handwheel further includes a direction indicator that indicates an input direction that corresponds to a reverse sewing direction.

14. The sewing machine as recited in claim 11, wherein:
the electronic display device is a touchscreen display device; and
the input is a touch swipe by the user on a surface of the touchscreen display device.

15. The sewing machine as recited in claim 14, wherein the touch swipe is made in a substantially linear direction.

16. The sewing machine as recited in claim 11, wherein:
the electronic display device is a capacitive touchscreen display device; and
the input is a gesture by the user near the capacitive touchscreen display device that does not involve touching the capacitive touchscreen display device.

17. The one or more non-transitory computer-readable media as recited in claim 16, wherein the gesture is a substantially linear wave of at least a portion of the user's hand near the capacitive touchscreen display device.

18. The sewing machine as recited in claim 11, wherein the input causes the needle attached to the needle bar to:
transition from a position above the fabric to a position in the fabric; or
transition from the position in the fabric to the position above the fabric.

19. The sewing machine as recited in claim 11, wherein:
the sewing machine is a long-arm quilting machine;
the needle bar and the electronic display device are positioned on a front end of the long-arm quilting machine; and
the circular physical handwheel is positioned on a rear end of the long-arm quilting machine.

20. The sewing machine as recited in claim 11, wherein:
the sewing machine further comprises a bobbin hook having a cutter; and
the depiction of the circular physical handwheel is further configured, upon receipt of alternating inputs from the user along the vertical dimension of the depiction, to send alternating electronic signals to the controller of the motor to cause the motor to cause the driveshaft to alternatingly rotate, which causes the cutter of the bobbin hook to cut through extraneous thread lodged within the bobbin hook in the sewing machine.

21. The sewing machine as recited in claim 11, wherein the electronic display device is attached directly on a front end of the sewing machine and configured to be operated on the front end of the sewing machine.

* * * * *